March 17, 1964  J. PFAU  3,125,664
MACHINING PROCESS BY ELECTRO-EROSION
Filed April 3, 1961  2 Sheets-Sheet 1
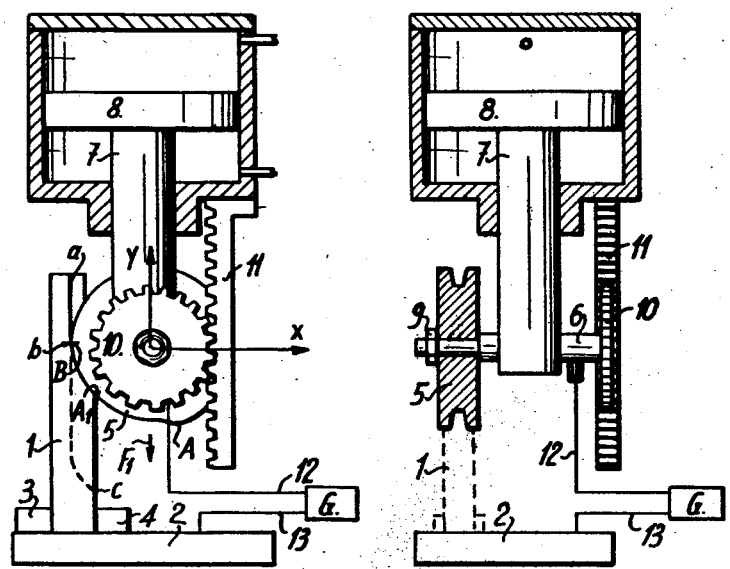
FIG. 1   FIG. 2
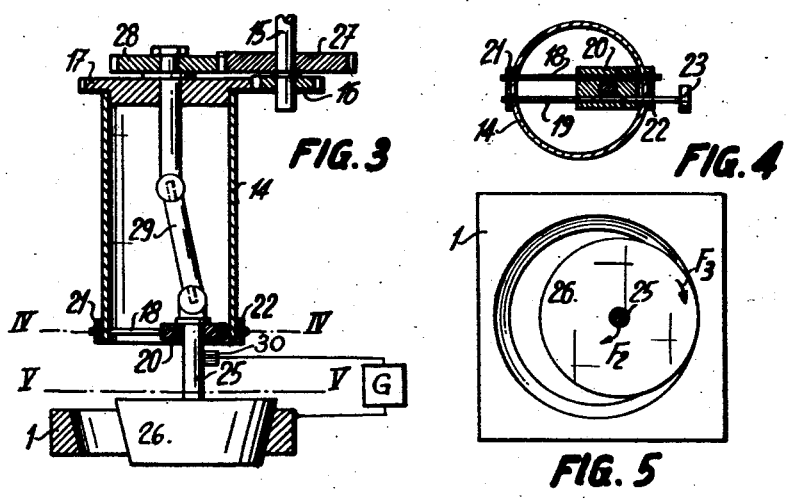
FIG. 3   FIG. 4
FIG. 5

March 17, 1964   J. PFAU   3,125,664
MACHINING PROCESS BY ELECTRO-EROSION
Filed April 3, 1961   2 Sheets-Sheet 2

United States Patent Office 3,125,664
Patented Mar. 17, 1964

3,125,664
MACHINING PROCESS BY ELECTRO-EROSION
Jean Pfau, Geneva, Switzerland, assignor to Ateliers des Charmilles S.A., Geneva, Switzerland, a corporation of Switzerland
Filed Apr. 3, 1961, Ser. No. 100,338
Claims priority, application Switzerland Apr. 6, 1960
12 Claims. (Cl. 219—69)

Processes of machining by electro-erosion are already known where material from a workpiece of conducting material to be machined, generally difficult to machine, such as tungsten carbide, is removed by causing sparks to explode between the workpiece and an electrode and by effecting a relative displacement between the workpiece and the electrode in proportion to the removal of the material.

In these processes it has been found that a predetermined quantity of material is removed not only from the workpiece but also from the electrode. For reducing the relative wear of the electrode, it has been proposed to use, whenever this is possible, a rotary electrode in the form of a body of revolution, of which a portion only of the circumference co-operates, at a given instant, with the workpiece, so as to remove material therefrom. This electrode is subjected to a relatively rapid movement of rotation, so that the wear of the electrode is distributed over its whole surface, instead of being concentrated on the portion which is disposed opposite the workpiece, as is the case when the electrode is stationary relatively to its support. Thus for a determined quantity of material removed from the electrode, there is obtained a much smaller deformation of its profile of this when using a rotary electrode. Meanwhile the wear of the electrode is not eliminated completely and, in practice, it is always necessary to replace the electrode after a predetermined time of machining and in any case to use a new electrode for finishing the workpiece.

The present invention has for its object a machining process by electro-erosion, according to which there is removed material from an electrically conducting workpiece by causing sparks to explode between the workpiece and an electrode in the form of a body of revolution mounted on a support in such a manner as to be capable of turning about its axis and effecting a relative displacement between the support of the electrode and the workpiece in proportion to the removal of the material therefrom. This process permits of effecting completely the machining of the workpiece by means of a single electrode which always presents a new portion for co-operating with the portion of the workpiece to be machined, by reason of the fact that the electrode is caused to turn in such a manner that, on the one hand, each portion of the electrode which has been brought opposite a part of the workpiece cannot return a second time into the machining position with respect to said part and that, on the other hand, the peripheral displacement of each point of the active portion of the electrode relatively to a reference system connected to the support of the electrode, is at least equal to the displacement of said support relatively to said part multiplied by the coefficient of wear of the electrode relatively to said workpiece, the direction of this peripheral movement being such that a fresh portion of the electrode comes into co-operation at each instant with the part of the workpiece, of which the machining is at the point of being terminated.

The accompanying drawings illustrate diagrammatically a number of examples of carrying out the process of the invention.

FIGS. 1 and 2 show respectively a side and partial sectional view of the electrode and the workpiece, in the case in which this latter should be profiled externally.

FIG. 3 is a diagrammatic view of a machine for a rectifying machining of a hole with a conical wall.

FIGS. 4 and 5 are sections on the lines IV—IV and V—V of FIG. 3.

Figure 6:
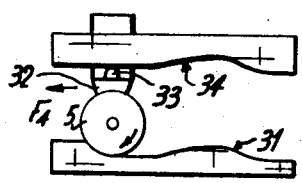

FIG. 6 relates to the profiling of a workpiece by means of an electrode of which the support is subjected to a non-rectilinear movement.

Figure 7:
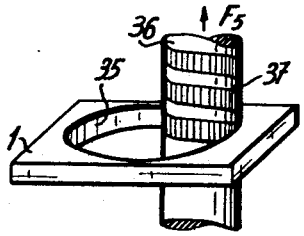

FIG. 7 shows, in perspective, the finishing machining of the wall of the cylindrical hole.

Figure 8:
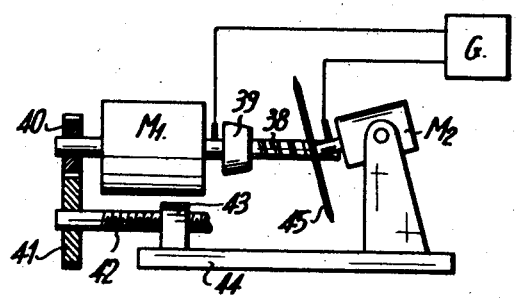

FIG. 8 is a diagrammatic view showing the machining of a threaded rod.

Figure 9:
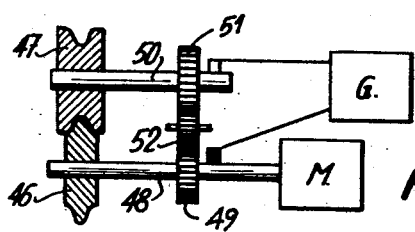

FIG. 9 shows a machine permitting the shaping of a drill.

With reference to FIG. 1, a workpiece is secured to a support 2 by means of two wedges 3 and 4, said support and said part being immersed, in the known manner, in a dielectric liquid, not shown, such as mineral oil.

The machining of the workpiece 1 is effected by means of an electrode 5 in the form of a body of revolution, secured to a shaft 6 rotatably mounted in the end of a tube 7 constituting the support of the electrode. The tube is secured to a piston 8 of a hydraulic servo-mechanism permitting the control of the global displacement of the electrode relatively to the workpiece 1 in proportion and according to the amount of material removed therefrom; servo-mechanisms of this type are known. Consequently, the servo-mechanism, will not be described in detail.

The electrode 5 is clamped on the end of the shaft 6 by means of a nut 9. The other end of this shaft carries a toothed wheel 10 engaging with a rack 11 which is stationary relatively to the framework of the machine, that is to say relatively to the support 2 of the workpiece 1.

A generator G of a known type permits of applying a difference of potential between the electrode and the workpiece, in such a manner as to generate between said two parts the sparks necessary for effecting the machining by electro-erosion. For this purpose, the generator 9 has supply conductors 12 and 13 which are connected respectively to the shaft 6 and to the support 2 of the workpiece 1.

The machining of the workpiece 1 shown in FIGS. 1 and 2 is effected by means of a single vertical track of the electrode, advancing the same from the top to the bottom in the direction of the arrow $F_1$. During the longitudinal movement of the tube 7 which is controlled by the servo-mechanism sensitive to the electric conditions of machining, the electrode turns in an anti-clockwise direction, by the engagement of the toothed wheel 10 with the rack 11. In the course of total machining, which extends to the upper part $a$ of the workpiece 1 up to the part indicated in dotted lines and indicated by the letter $c$, the electrode has effected a rotation less than a complete revolution. In this manner, none of the portions which have been brought opposite the part to be machined can return into the machining position a second time.

In FIG. 1 the wear of the electrode has been considerably exaggerated so as to facilitate the explanation of the advantages provided by the process described. The point A of the periphery of the electrode 5 is that which has come into action at the start of the machining and the part of the profile of the electrode located between A and $A_1$ is deformed by reason of the machining, but can no longer return to the active position for the machining of the workpiece 1. Opposite the part $b$ of the surface of the workpiece 1 to be machined, is located a portion B of the electrode 5, this portion B not having so far been utilised for the machining, so that the profile of the electrode at this point is entirely correct, as it is not deformed by wear.

Between the points $a$ and $b$ of the machined surface, the periphery of the electrode 5 moves progressively away from the workpiece, so that practically no discharge occurs between these parts and that the periphery of the electrode which is situated above the point B is not subjected to any wear of an electro-erosive nature before having arrived in the active machining position. In this manner, a fresh portion of the electrode comes into co-operation at each instant with the part $b$ of the workpiece, of which the machining is at the point of being terminated.

Meanwhile it will be evident that the rotation of the electrode should not fall below a predetermined value, as there would thus be produced an electro-erosive wear above the point B. For obviating this inconvenience, it suffices that the peripheral movement of each point of the active portion of the electrode relatively to a reference system such as $x$, $y$, connected to its support, is at least equal to the movement of the support of the electrode relatively to the workpiece multiplied by the coefficient of wear of the electrode relatively to said workpiece. In other words, if under the given conditions of machining, the removal of material of the electrode is equal to half the removal of material from the workpiece, it is necessary that the movement at the point B of the electrode 5, during the unit of time, should be at least equal to half the movement of the point $b$ from the machined surface during the same time, that is to say of the movement towards the bottom of the tube 7 controlling the advance of the electrode.

The process described is very advantageous as a single electrode suffices to effect the complete machining of a workpiece, which reduces the machining costs, not only by reason of saving one or more electrodes, but by reason of the fact that the labor of rigorously placing in position one or more replacement electrodes in the course of machining, is avoided completely.

FIG. 3 shows a machine permitting of the rectification machining of a conical hole provided in a workpiece 1. This machine comprises a tube 14 capable of being driven in rotation by a motor shaft 15 and through the medium of two toothed pinions 16 and 17 secured respectively to the shaft 15 and on the tube 14. As shown clearly in FIG. 4, the lower part of the tube 14 has a smooth transverse rod 18 and a threaded rod 19 serving as a support for a bearing 20. The rod 18 is secured in two parts 21 and 22 secured to the tube 14. The threaded rod 19 is mounted in such a manner as to be capable of turning in these two parts 21 and 22 and is engaged in a threaded bore of the bearing 20. This rod 19 has a milled head 23 permitting its operation.

A shaft 25, carrying a conical electrode 26, passes through the bearing 20 and is driven in rotation from the shaft 15 through the medium of pinions 27, 28 and a Cardan transmission 29. The difference of potential desired between the electrode and the workpiece is provided by a generator G through the medium of a sliding contact 30 bearing against the shaft 25 of the electrode 26. This machine permits of causing the geometrical axis of the electrode 26 to turn about the axis of the conical hole of the workpiece 1, for example in the direction of the arrow $F_2$, whilst at the same time the electrode turns about itself in the direction of the arrow $F_3$. This arrangement thus permits of obtaining the same advantages as those mentioned with reference to FIGS. 1 and 2. As will be well understood, the rotation of the electrode 26 about itself should be sufficiently slow so that no part of this electrode can come twice in succession in the machining position relatively to the workpiece 1.

As the electrode is of conical shape, the peripheral movement of this electrode has different values, according as to whether the part considered is more or less spaced from the summit of the cone. For obtaining the advantages mentioned with reference to FIG. 1, it is necessary that the peripheral part of the electrode which has the smallest movements, that is to say the part co-operating with the lower edge of the hole of the workpiece 1 in FIG. 3, is subjected to a peripheral displacement equal to the displacement of the electrode relatively to the part multiplied by the coefficient of wear of the electrode relatively to the workpiece.

FIG. 6 shows a modification in which a workpiece 1 to be machined, should be operated upon on a non-rectilinear surface 31. For this purpose there is used a machine having a rotary electrode 5 carried by an arm 32 which is moved in the direction of the arrow $F_4$ relatively to the workpiece 1 to be machined. The arm 32 has a stop 33 bearing against a profile 34 under the action of an elastic force, not shown. The means for producing the advancement of the arm 32 in the direction of the arrow $F_4$ and for maintaining the stop 33 in contact with the profile 34 have not been illustrated as they are known per se and do not form part of the subject of the invention.

Similarly, the means for causing the electrode 5 to turn are not shown and may be of any type, provided they are actuated in such a manner that each portion of the electrode which has been opposite a part of the workpiece cannot return a second time in the machining position with the workpiece.

FIG. 7 relates to the rectification by electro-erosion of the interior wall of a cylindrical bore. As shown in this figure, a workpiece 1 has a bore 35 into which is introduced an electrode 36 of cylindrical shape. When the electrode 36 is caused to turn about itself in a clockwise direction, the axis of this electrode must turn in the interior of the bore, in such a manner that the machining point between the electrode and the edge of the bore is displaced, relatively to the axis of the bore, also in the clockwise-direction. Although the periphery of the electrode is substantially smaller than that of the bore, it is possible to be able to effect a circular machining stroke over the whole circumference of the bore using only a single electrode. For this purpose, the machine for the machining comprises means, not shown, for causing a translation of the electrode 36 along its axis of rotation, that is to say in the direction of the arrow $F_5$, shown in FIG. 6. Thus, the total active surface of the electrode during the course of machining has the shape of a tape 37, which has been indicated in FIG. 5, this tape being wound in a helix and without covering on the surface of the electrode.

It is to be observed that a movement in the axial direction of the electrode is not limited to a single case of machining a bore and that, in principle, it is possible to impart to the electrode, in addition to its angular displacement, a displacement of translation having at least one component parallel to the generatrices of the electrode which commences to co-operate with the part for the machining, each time the active surface of the electrode is generated by the rotation of a straight line defining a plane with the axis of the electrode. Thus, during the rectification of a bore presenting a slight conicity, it is also possible to displace the electrode in the direction of its generatrix in contact with the workpiece. Similarly, during the machining of the type shown in FIG. 6, it is also possible to displace the electrode 5 in the direction of its axis of rotation.

FIG. 8 shows a machine permitting of machining a thread on a clindrical workpiece 38. This workpiece is secured to a mandrel 39 entrained in slow rotation by a motor $M_1$, of which the spindle carries a pinion 40 driving through the medium of a toothed wheel 41, a threaded rod 42 engaged in a nut 43 secured to a support 44 for the electrode. This latter is constituted by a disc 45 driven in slow rotation by a motor $M_2$ fixed on the support 44. A generator G permits of applying a difference of potential between the workpiece 38 and the electrode 45 which are plunged into a dielectric liquid, not shown. The speeds of rotation of the motors $M_1$ and $M_2$ are adjusted in operation the one relatively to the other by any known means, in such a manner as to obtain the conditions which have already been referred to hereinbefore so that the portion of the workpiece, of which the machining is at the point of being completed, always co-operates with a new portion of the electrode.

FIG. 9 relates to an example of forming a drill 46 by means of an electrode 47. The drill 46 is mounted on a shaft 48 carrying a toothed pinion 49 and driven by a motor M. The electrode 47 is mounted on a shaft 50 carrying a pinion 51 gearing with an intermediate pinion 52 itself driven by the pinion 49 in such a manner as to turn in the same direction as the shaft 48.

The selection of the number of teeth of the pinions 49 and 50 permits of causing the electrode 47 to turn relatively to the drill 46 in such a manner as to obtain the above-mentioned conditions so that each part of the drill co-operates, at the end of machining, with a fresh portion of the electrode.

It will be understood that it is possible to provide numerous modifications in carrying out the process forming the subject of the invention. In particular, the rotation of the electrode may be produced by different means, for rendering it dependent on the displacement of the electrode relatively to the workpiece, for example by a flexible belt wound on a pulley secured in rotation with the electrode and secured at its free end to a part of the machine which does not move at the same time as the support of the electrode. A spring should therefore be provided for causing the pulley to turn in such a manner as to cause the rolling of the band thereon.

It is, however, not necessary that the rotation of the electrode takes place in a continuous manner and it is possible to readily provide a device causing it to turn intermittently. This device may, for example, have suitable timing means and be actuated in such a manner as to cause the electrode to turn at regular intervals of time, without there being any connection between this device and that provoking the advance of the electrode. However, it is necessary that the operator regulates the device for driving the electrode in rotation in such a manner that this driving takes place in the abovementioned necessary conditions, that is to say that each portion of the electrode cannot return a second time into the machining position and that, on the other hand, the peripheral displacement of each point of the active portion of the electrode relatively to a system of reference connected to the support of this is at least equal to the displacement of the support of the electrode relatively to the workpiece multiplied by the coefficient of wear of the electrode relatively to the workpiece, the direction of this peripheral displacement being such that a fresh portion of the electrode comes into co-operation at each instant with the portion of the workpiece, of which the machining is at the point of being terminated.

I claim:

1. A process of machining by electro-erosion, consisting in removing material from an electrically conductive workpiece, which material is generally difficult to machine, such as tungsten carbide, by causing sparks to explode between said workpiece and an electrode, said electrode being in the form of a body of revolution mounted on a support in such a manner as to be capable of turning about its axis and causing a relative displacement between said support of said electrode and said workpiece, causing said electrode to turn in such a manner that, on the one hand, each portion of said electrode which has been brought opposite a part of said workpiece, cannot return a second time into said machining position with said workpiece, whilst peripheral displacement of each point of the active portion of said electrode relatively to a reference system connected to said support of said electrode, is at least equal to the displacement of the support of the electrode relatively to said workpiece multiplied by the coefficient of wear of said electrode relatively to said workpiece.

2. A process according to claim 1, wherein the direction of peripheral displacement is such that a fresh portion of said electrode comes into cooperation at each instant with a part of said workpiece, and of which the machining is on the point of being terminated.

3. A process according to claim 1, in the case in which the displacement of said support of said electrode relatively to said workpiece, is rectilinear, consisting in imparting to said electrode an angular displacement proportional to said rectilinear displacement.

4. A process according to claim 1, in the case in which said active surface of said electrode is generated by the rotation of a straight line determining a plane with the axis of said electrode, consisting in applying to said electrode, in addition to its angular displacement, a displacement of translation having a component parallel to the generating line of said electrode which commences to cooperate with said workpiece.

5. A process according to claim 1, in the case of machining a cylindrical wall, consisting in the use of a cylindrical electrode of which the longitudinal axis is parallel to that of said wall, imparting to the longitudinal axis of said electrode a movement of rotation about the axis of said wall, imparting a longitudinal movement of one of said axes relatively to the other axis and causing said electrode to turn about itself, whereby the active surface of said electrode during the course of the machining, has the shape of a ribbon wound in a helix and without a covering on the surface of said electrode.

6. A machine for machining by electro-erosion, comprising a support for a workpiece, a support for a rotary electrode, means generating successive sparks between said electrode and said workpiece, means for assuring a relative movement between said electrode and said workpiece, and a device rotating said electrode in proportion to the displacement of said support of said electrode relatively to said workpiece in such a manner that, on the one hand, each portion of said electrode which has been brought opposite a part of said workpiece, cannot return a second time into machining position with said part, whilst peripheral displacement of each point of the active portion of said electrode relative to a reference system connected to said support, is at least equal to the displacement of the support relatively to said workpiece multiplied by the coefficient of wear of said electrode relatively to said workpiece.

7. A machine according to claim 6, comprising a mechanical conection ensuring the driving in rotation of said electrode in proportion to the displacement of said support of said electrode relatively to said workpiece.

8. A machine according to claim 6, comprising two distinct motors, one of said motors provoking relative displacement between said support of said electrode and said workpiece to be machined, said other motor producing the rotation of said electrode.

9. A machine according to claim 6, in the case in which the active surface of said electrode is generated by the rotation of a straight line determining a plane with the axis of said electrode, comprising a device for provoking, at each instant, a translation of said electrode along that of its generatrices which commences to cooperate with said workpiece.

10. A machine according to claim 6, comprising means for provoking a non-rectilinear relative movement between said support of said electrode and said workpiece.

11. A machine according to claim 6, in the case in which the relative displacement between said support of the said electrode and said workpiece is rectilinear, comprising a stationary rack and a toothed wheel coupled to said electrode and in engagement with said rack, said rack being parallel to the direction of displacement between said electrode and said workpiece, in such a manner that the relative displacement of said electrode relatively to said workpiece, provokes simultaneously a rotation of said electrode about itself.

12. A machine according to claim 6, as applied to a workpiece, said workpiece being itself a body of revolution of which the axis is parallel to that of said electrode, said workpiece and said electrode being each mounted on a rotary shaft, and a single motor which drives simultaneously said two shafts in the same direction of rotation.

References Cited in the file of this patent

UNITED STATES PATENTS

| | | |
|---|---|---|
| 2,059,236 | Holslag | Nov. 3, 1936 |
| 2,773,968 | Martelloti et al. | Dec. 10, 1956 |
| 2,785,280 | Eisler et al. | Mar. 12, 1957 |
| 2,818,491 | Matulaitis | Dec. 31, 1957 |
| 2,982,842 | Tuscher | May 2, 1961 |